United States Patent [19]

Tezuka

[11] Patent Number: 5,577,856
[45] Date of Patent: Nov. 26, 1996

[54] BEAM SUPPORT SYSTEM FOR FORMING PRECOMPRESSED WOOD JOINTS

[76] Inventor: Junichi Tezuka, 7-20, 2 Chome Kawazoe - 1J0 Minami-ku, Sapporo, Japan

[21] Appl. No.: 233,518

[22] Filed: Apr. 26, 1994

[30] Foreign Application Priority Data

Aug. 10, 1993 [JP] Japan ................. 5-24602 U
Sep. 10, 1993 [JP] Japan ................. 5-054166 U

[51] Int. Cl.$^6$ .................................................. F16B 17/00
[52] U.S. Cl. ........................... 403/294; 52/656.9; 52/702; 403/331; 403/381; 403/409.1
[58] Field of Search ................ 52/251, 702, 656.9, 52/712, 714, 721.1; 403/41, 294, 331, 374, 381, 409.1; 411/155, 156, 461, 462, 469, 544; 5/282.1, 288, 296, 299, 300; 211/191

[56] References Cited

U.S. PATENT DOCUMENTS

| | | | |
|---|---|---|---|
| 497,915 | 5/1893 | Fulghum et al. | 403/294 |
| 509,364 | 11/1893 | Coffeen, Jr. | 403/381 |
| 573,428 | 12/1896 | Yost | 5/300 |
| 673,568 | 5/1901 | Reinhold | 5/300 |
| 792,979 | 6/1905 | Fulghum | 403/331 |
| 821,202 | 5/1906 | Thomas | 403/294 X |
| 1,055,392 | 3/1913 | Fox | 5/300 |
| 1,074,854 | 10/1913 | Fox | 5/300 |
| 1,095,039 | 4/1914 | Spencer | 411/155 X |
| 1,099,764 | 6/1914 | Polansky | 403/409 X |
| 1,350,155 | 8/1920 | Hellweg | 403/294 X |
| 1,351,758 | 9/1920 | Johnson et al. | 5/300 |
| 1,695,909 | 12/1928 | Bauer | 52/702 |
| 2,130,546 | 9/1938 | Hovey | 411/155 X |
| 2,735,146 | 2/1956 | Purviance | 403/294 |
| 2,867,160 | 1/1959 | Wangerow | 403/294 X |
| 3,468,571 | 9/1969 | Farmer | 403/381 |
| 3,563,581 | 2/1971 | Sommerstein | 403/314 X |
| 3,672,624 | 6/1972 | Keller | 248/243 |
| 3,831,338 | 8/1974 | Klingensmith et al. | 52/721 X |
| 4,019,298 | 4/1977 | Johnson, IV | 403/381 X |
| 4,558,968 | 12/1985 | Meickl | 5/296 X |
| 4,569,451 | 2/1986 | Parrott et al. | 211/191 |
| 4,596,105 | 6/1986 | Farmer | 403/381 X |
| 4,676,040 | 6/1987 | Monaghan et al. | 403/381 X |
| 4,729,484 | 3/1988 | McConnell | 211/191 X |
| 4,928,834 | 5/1990 | Neiman | 211/191 |
| 5,012,938 | 5/1991 | King | 211/191 |
| 5,061,111 | 10/1991 | Hosokawa | 403/232.1 |
| 5,242,239 | 9/1993 | Hosokawa | 403/258 |
| 5,253,945 | 10/1993 | Hosokawa | 403/407.1 X |
| 5,342,138 | 8/1994 | Saito et al. | 403/187 X |
| 5,438,811 | 8/1995 | Goya | 52/656.9 X |

FOREIGN PATENT DOCUMENTS

| | | | |
|---|---|---|---|
| 496480 | 4/1930 | Germany | 403/294 |
| 242318 | 5/1946 | Switzerland | 248/235 |

*Primary Examiner*—Blair Johnson
*Assistant Examiner*—Andrea Chop
*Attorney, Agent, or Firm*—Chernoff, Vilhauer, McClung & Stenzel

[57] ABSTRACT

A beam support system fastens an end portion of a wood beam to a generally upright surface of a beam-anchoring member. A mutually-cooperative interface structure is provided on a beam-fastening member and on the end portion of the beam, respectively. The interface structure forces the end portion compressively against the upright surface in a direction generally perpendicular thereto automatically in response to engagement of the end portion with the fastening member in a direction generally parallel to the upright surface. The fastening member is mounted to a wood beam-anchoring member preferably by a resiliently-deformable spring member which resiliently compresses the beam-anchoring member in a direction generally perpendicular to the upright surface thereof.

9 Claims, 11 Drawing Sheets

BEAM SUPPORT SYSTEM FOR FORMING PRECOMPRESSED WOOD JOINTS

BACKGROUND OF THE INVENTION

The present invention relates to a fastener for fastening an end portion of a wood beam to a generally upright surface of a beam-anchoring member, such as a wood post or other beam. More particularly, the invention relates to such a fastener which compresses the end portion of the beam against the upright surface of the beam-anchoring member to provide a long-lasting tight junction despite subsequent shrinkage of the wood.

In the use of large wood beams, such as laminated beams, box beams or dimension lumber beams for spanning relatively long distances, it has become increasingly critical to provide end connections with posts or other beam-anchoring members which not only provide support vertically and laterally, as do conventional beam and joist hangers, but which also compress the ends of the beam longitudinally to provide a lasting tight joint. Otherwise, a gradual separation occurs between the ends of the beam and the beam-anchoring members due to wood shrinkage, which weakens the joint structurally.

One way of diminishing this problem in the past has been to use spring and washer systems on the connecting hardware to compensate for wood shrinkage. However, such systems require considerable labor to install and are limited in their ability to compensate for excessive shrinkage. Other systems, such as those shown in U.S. Pat. Nos. 5,061,111, 5,242,239 and 5,253,945, provide mechanisms for compressing the end portion of the beam against the beam-anchoring member to compensate for expected shrinkage. However, these latter systems likewise require considerable installation labor, due to the need first to connect the beam to the beam-anchoring member and then to compress the end portion of the beam as separate steps. Moreover, such end-compression systems do not adequately compensate also for future shrinkage of a wood beam-anchoring member, which can also permit gradual separation of the joined members, and do not adequately provide for side fastening of the beam to resist lateral forces and transverse splitting of the end portions.

SUMMARY OF THE INVENTION

The present invention provides a wood beam support system which overcomes the foregoing deficiencies of the prior systems.

In accordance with one aspect of the invention, a fastening member is provided for supportively interconnecting an end portion of a beam to a generally upright surface of a beam-anchoring member, with a mutually-cooperative interface structure on the fastening member and on the beam end portion, respectively, for forcing the end portion compressively against the upright surface automatically in response to the engagement of the end portion with the fastening member in a direction of engagement generally parallel to the upright surface. Thus the interconnection of the beam end portion with the upright surface, and the compression of the end portion against the upright surface, can be accomplished in a single engagement step saving considerable time and labor in the installation process.

Preferably, the compression of the end portion of the beam, automatically in response to the interconnecting engagement of the end portion, is accomplished by providing the fastening member with an elongate cam surface which, when the fastening member is mounted, is longitudinally inclined relative to the upright surface of the beam-anchoring member and in opposed relationship thereto, so that a first portion of the cam surface is spaced from the upright surface by a first distance and a second portion is spaced from the upright surface by a second distance less than the first distance. The end portion of the beam includes an end surface for engaging the upright surface of the beam-anchoring member, and a cam follower surface interior of the end surface for slidably engaging the inclined cam surface on the fastening member, the cam follower surface being spaced from the end surface of the beam by a distance less than the aforementioned first distance but greater than the aforementioned second distance. Thus, as the cam follower surface of the end portion of the beam is forced, by hammering, along the cam surface of the fastening member, the end portion simultaneously automatically becomes wedged compressively between the cam surface and the upright surface of the beam-anchoring member.

According to a still further aspect of the invention, a resiliently-deformable spring member is provided for mounting the fastening member on a wood beam-anchoring member and resiliently compressing the beam-anchoring member in a direction generally perpendicular to its upright surface, to compensate for future shrinkage of the beam-anchoring member. This spring structure is usable, within the scope of the present invention, not only in combination with the automatically compressive structure described above, but in combination with any end-portion compressing structure such as those shown in the aforementioned U.S. Pat. Nos. 5,061,111, 5,242,239 and 5,253,945, which are hereby incorporated by reference.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 5:
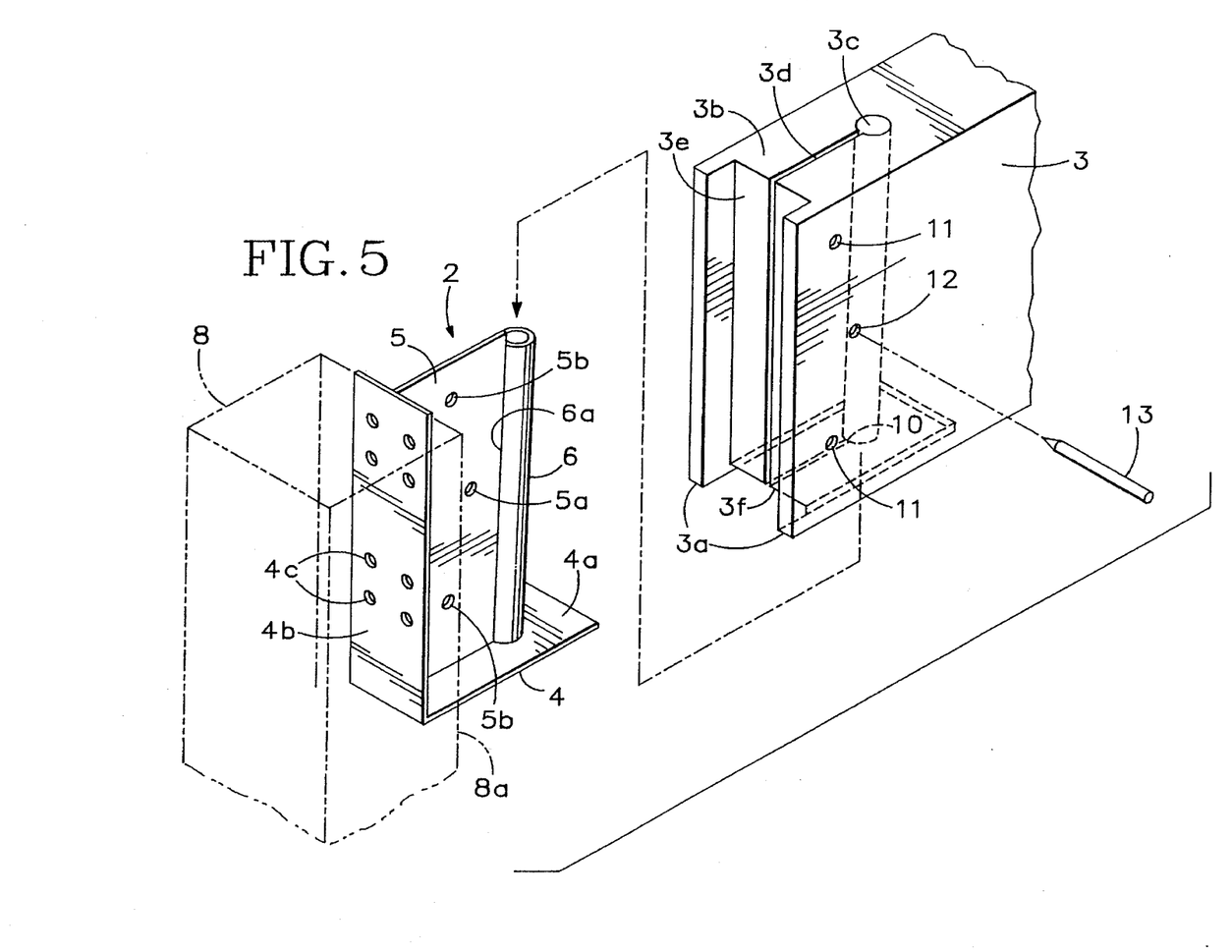
FIG. 5 is an exploded perspective view of a beam support system utilizing the fastening member of FIG. 1.
Figure 6:
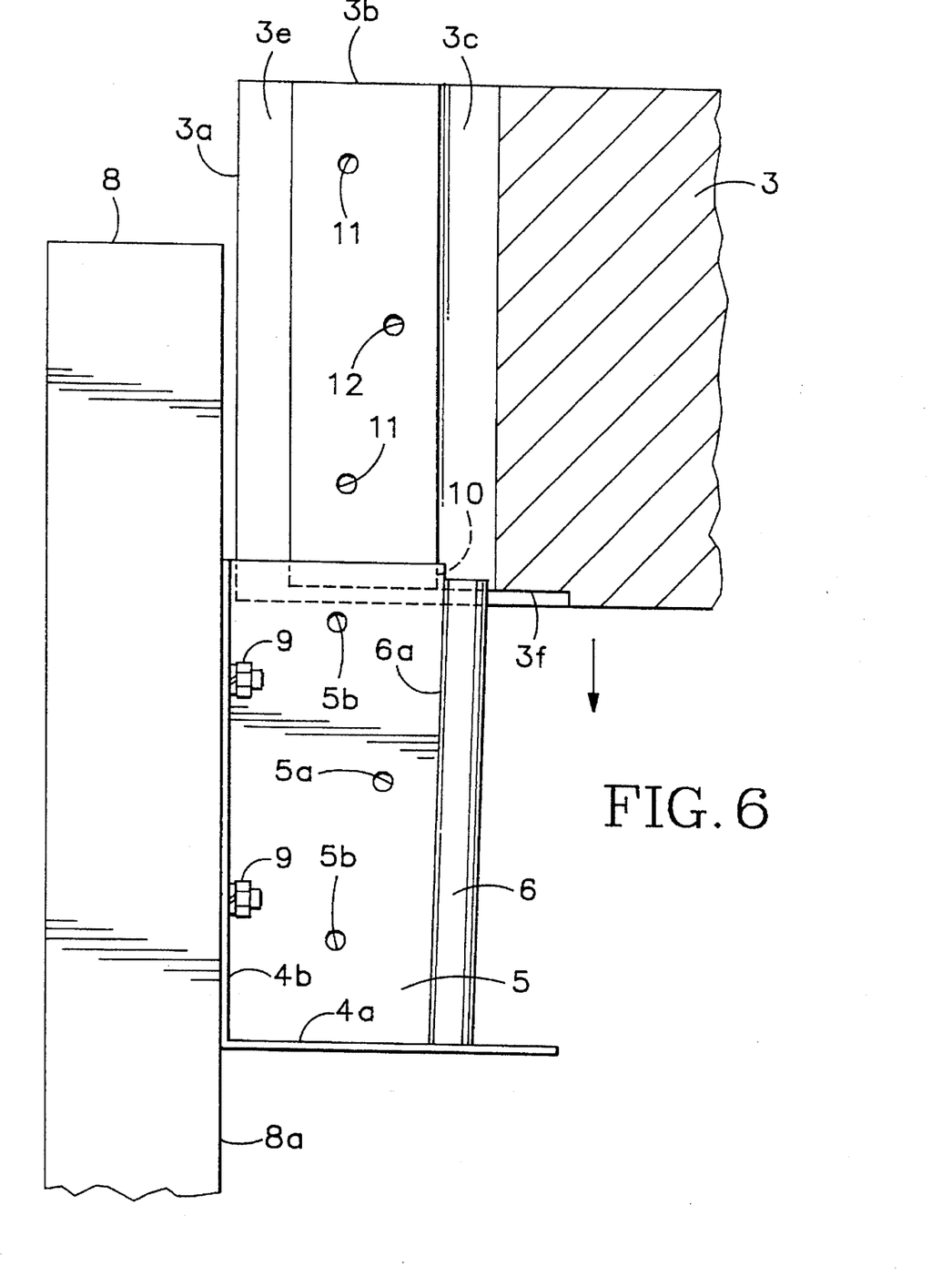
FIG. 6 is a partially sectional side view of the system of FIG. 5, shown preparatory to the interconnection of the beam with a post.
Figure 7:
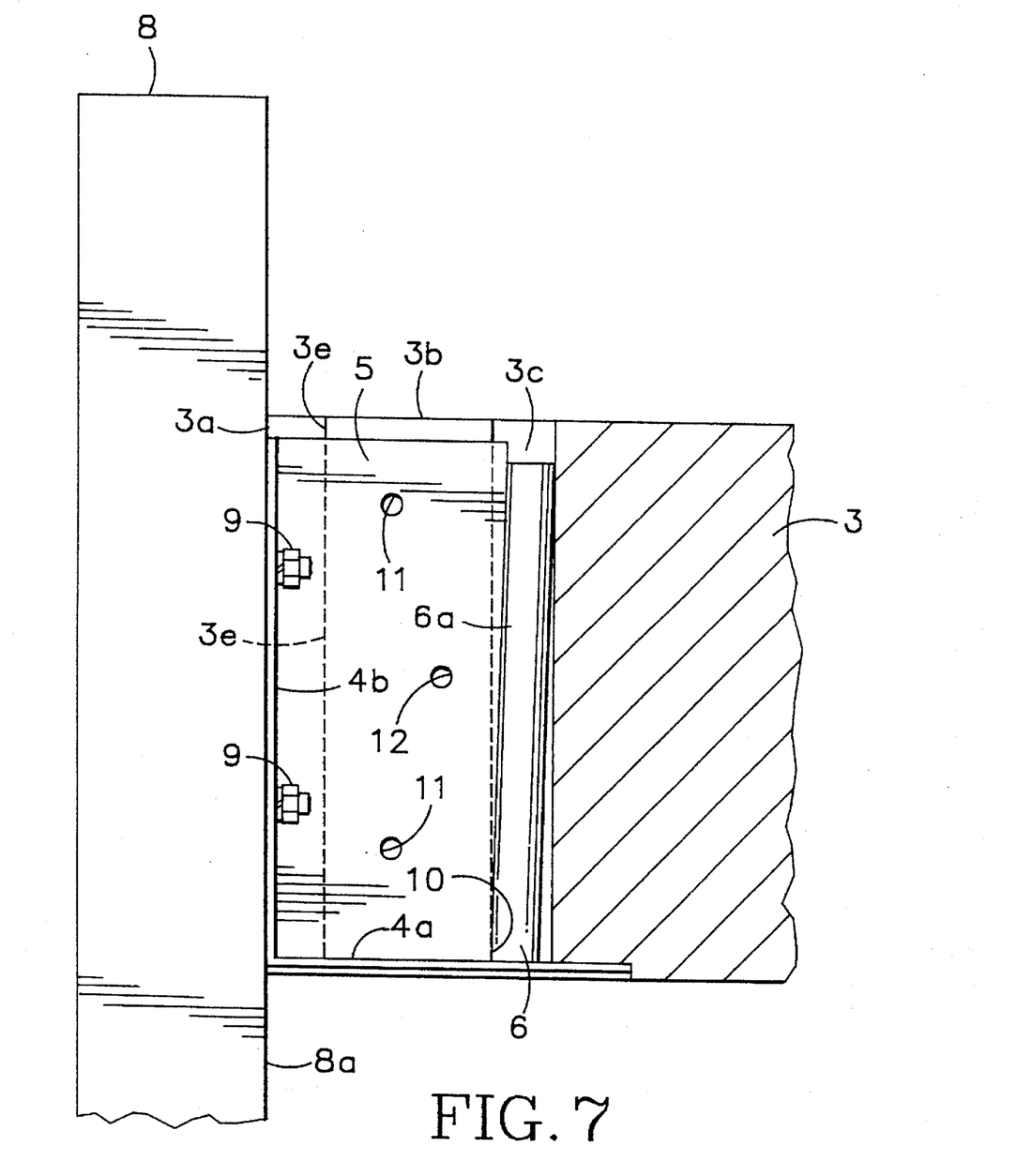
FIG. 7 is a partially sectional side view of the system of FIG. 5, shown after the beam is compressively interconnected with the post.
Figure 8:
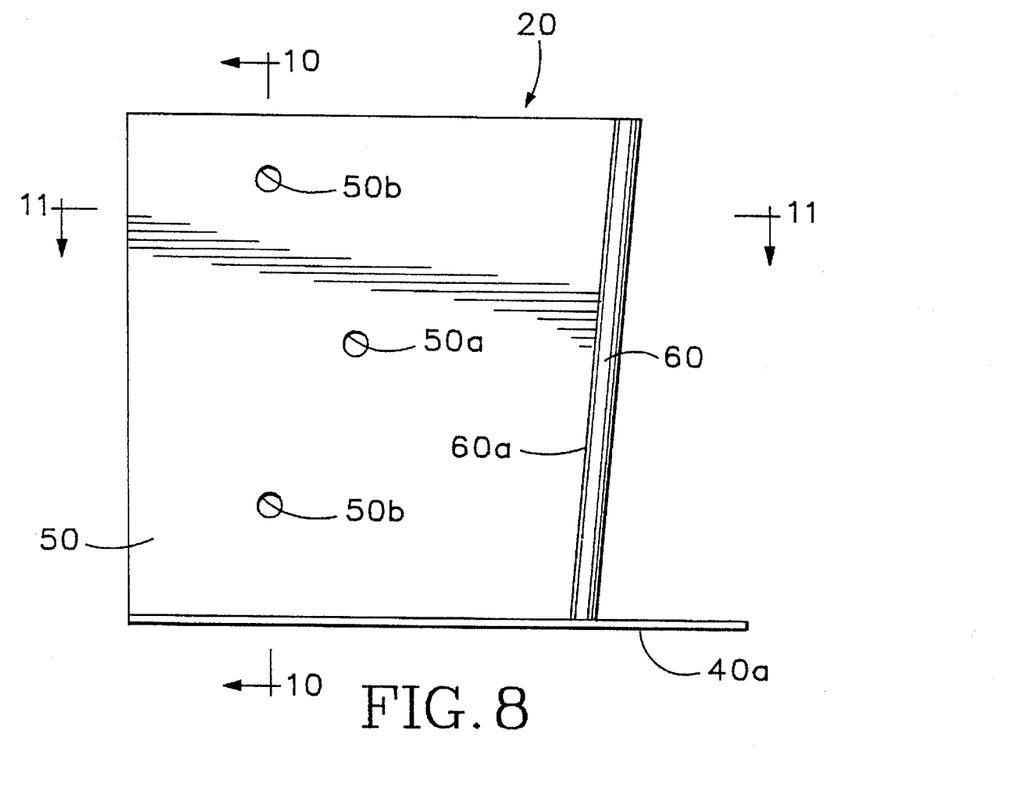
FIG. 8 is a side view of a second embodiment of a beam-fastening member in accordance with the present invention.
Figure 9:
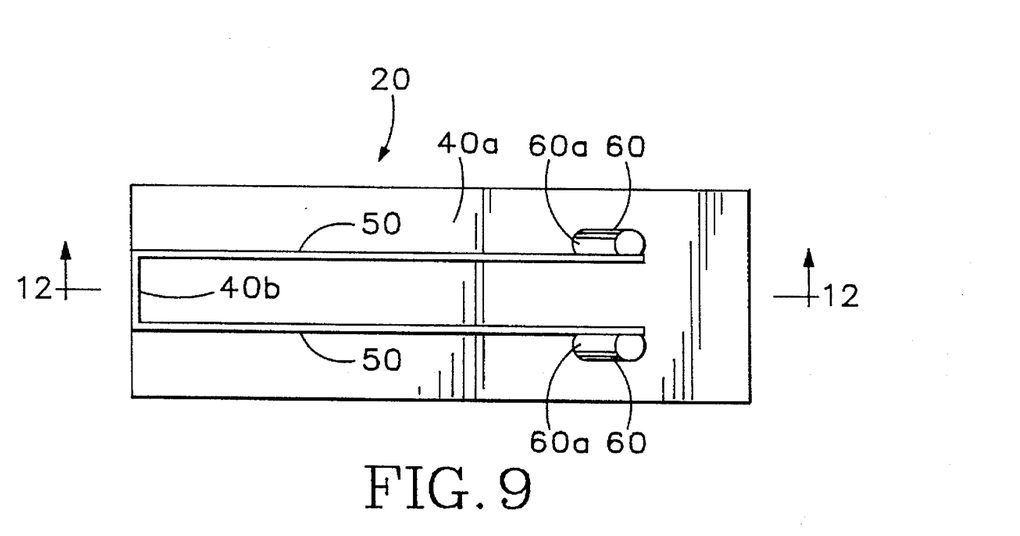
FIG. 9 is a top view of the fastening member of FIG. 8.
Figure 10:
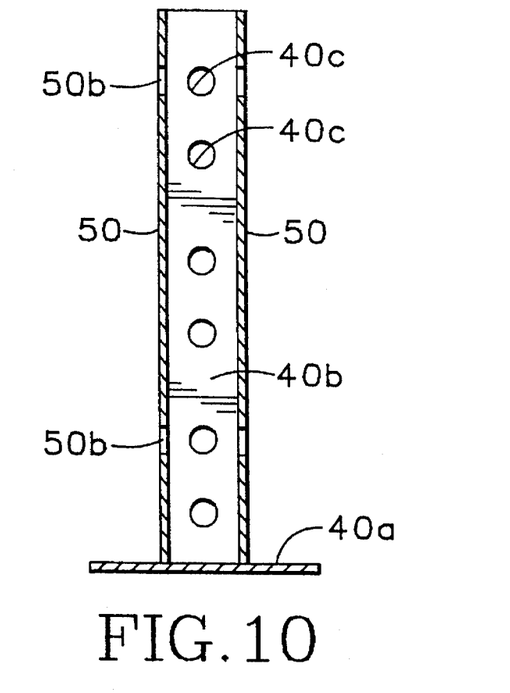
FIG. 10 is a sectional view taken along line 10—10 of FIG. 8.
Figure 11:
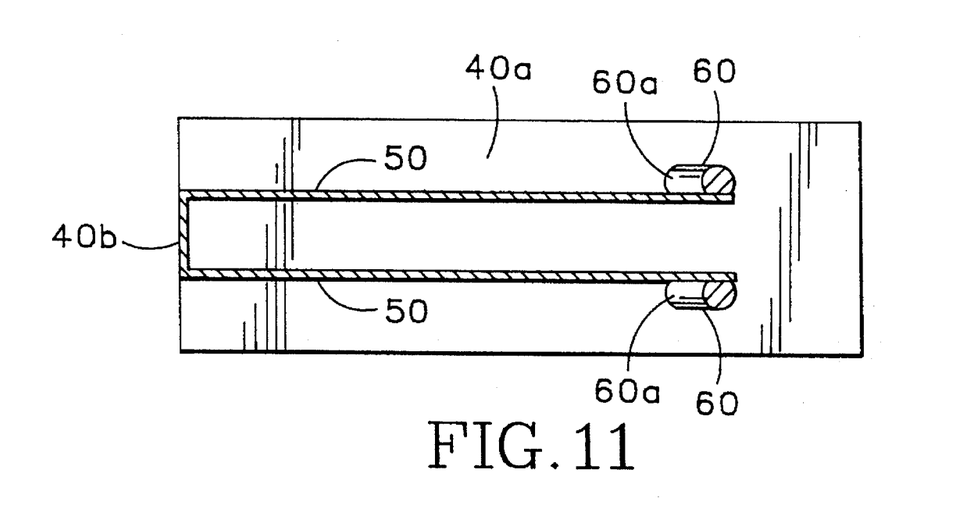
FIG. 11 is a sectional view taken along line 11—11 of FIG. 8.
Figure 12:
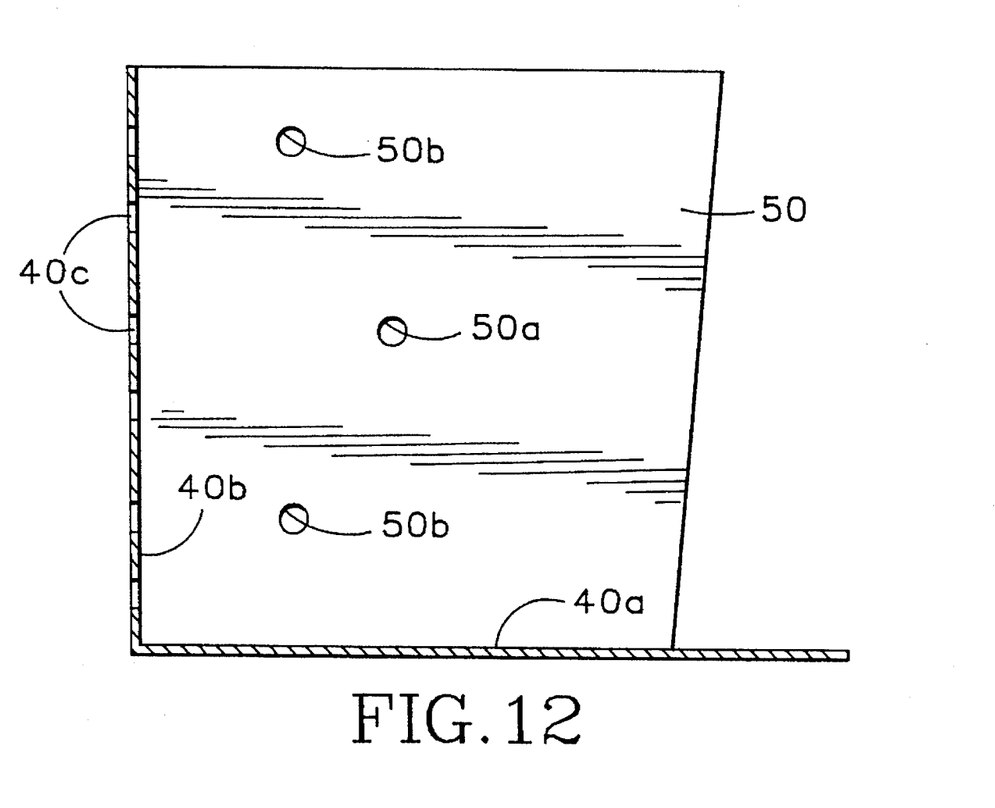
FIG. 12 is a sectional view taken along line 12—12 of FIG. 9.
Figure 13:
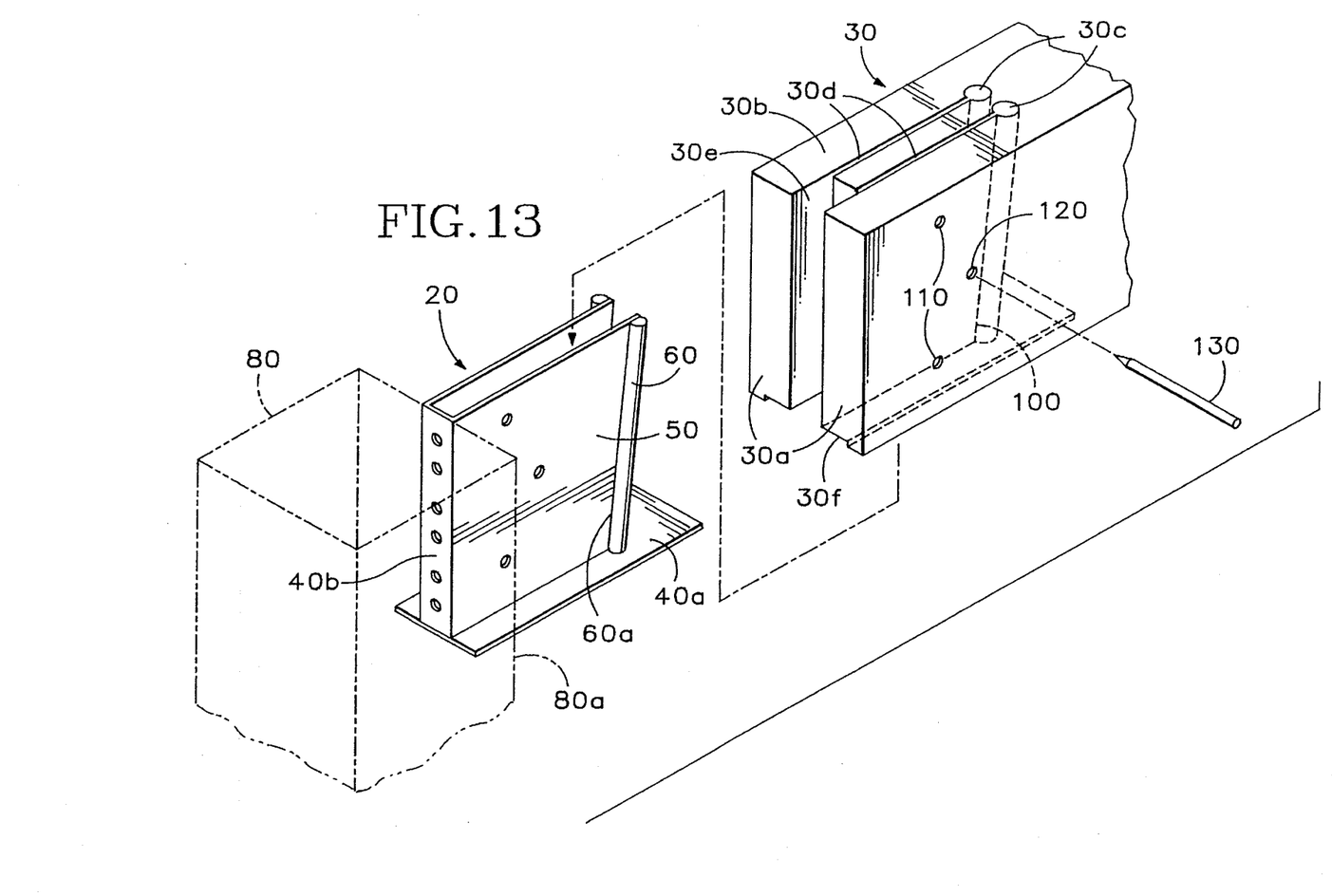
FIG. 13 is an exploded perspective view of a beam support system utilizing the fastening member of FIG. 8.

FIGS. 1–7 show a first exemplary embodiment of a beam support system in accordance with the present invention. The system includes a fastening member indicated generally as 2 which comprises an L-shaped flange 4 having a base 4a and an upright mounting plate 4b with a vertical web 5 welded centrally thereto. The web 5 has a forward edge 5c at an inclination relative to the upright mounting plate 4b so that the edge 5c is further from the plate 4b at its top than at its bottom. Welded to the forward edge 5c, and oriented at the same inclination, is a wood compression member in the form of a cylindrical tube 6. A surface portion 6a of the tube 6, which faces the plate 4b in opposed relation thereto, forms an elongate cam surface which is likewise inclined relative to the upright plate 4b. Preferably, the plate 4a extends beyond the tube 6 for added stability. The plate 4b has bolt-receiving apertures 4c formed therein symmetrically on opposite sides of the web 5 for fastening to an upright surface 8a of a beam-anchoring member, which can be another beam or a post 8 as shown in FIGS. 5–7.

Another element of the beam support system of FIGS. 1–7 includes a beam 3 having an end surface 3a for engaging the upright surface 8a of the beam-anchoring member 8. The beam 3 has an end portion 3b with an interface structure formed therein comprising a vertical aperture 3c, having a diameter sufficiently larger than that of the tube 6 that it can receive the tube 6 at an inclination as shown in FIG. 7, and a slot 3d for receiving the web 5. A channel 3e at the end of the beam is formed with sufficient width to receive the plate 4b and with sufficient depth to receive, without interference, the protruding portions of the nut and bolt assemblies 9 which pass through the apertures 4c in the plate 4b to mount the fastening member 2 to the post 8, as shown in FIG. 6. Another channel 3f is preferably formed on the bottom of the end portion 3b to receive the base 4a of the fastening member 2.

To form the interface structure in the beam 3, the beam is first cut so that its length coincides with the distance between the upright faces of the beam-anchoring members (e.g. posts or other beams) upon which it is to be supported. The aperture 3c is drilled vertically so that the portion 10 of its interior wall closest to the end surface 3a is spaced inwardly of the end surface 3a by a distance less than the distance separating the top of the inclined cam surface 6a from the back of the plate 4b (which will coincide with the upright surface 8a of the beam-anchoring member 8 when mounted thereon), but greater than the distance separating the bottom of the cam surface 6a from the back of the plate 4b. The slot 3d and channels 3e and 3f are likewise formed in the end portion 3b, together with transverse apertures 11 and 12 respectively. Thereafter, with the fastening member 2 bolted to the beam-anchoring member 8 by nut and bolt assemblies 9, the end portion 3b is raised above the fastening member 2 and slid downwardly onto the fastening member with the aperture 3c receiving the tube 6 and the slot 3d receiving the web 5. As the end portion 3b moves downwardly, the bottom of the portion 10 of the interior surface of the aperture 3c acts as a cam follower surface which slidably engages the inclined cam surface 6a of the tube 6. Because the surface 10 is spaced from the end surface 3a by a distance greater than the distance separating the bottom of the cam surface 6a from the upright surface 8a of the beam-anchoring member, the end portion 3b will slide downwardly onto the fastening member 2 only partially before encountering interference between the upright surface 8a and beam end surface 3a. Thereafter, the end portion 3b is hammered downwardly further, thereby automatically forcing the end surface 3a of the beam against the upright surface 8a of the beam-anchoring member and compressing the end portion 3b between the cam surface 6a and the upright surface 8a. The base 4a of the fastening member 2 acts as a stop to limit the extent to which the end portion 3b can be hammered downwardly onto the fastening member 2.

Thereafter, the adequacy of the compression of the end portion 3b can be checked by inserting a pin 13 through the transverse aperture 12 in the beam. If the compression is sufficient, the pin should pass easily through the aperture 5a in the web 5. Nut and bolt assemblies (not shown) can be inserted transversely through the apertures 11 in the beam, and through mating apertures 5b in the web 5, to resist lateral forces and transverse splitting of the end portion 3b.

Figure 1:
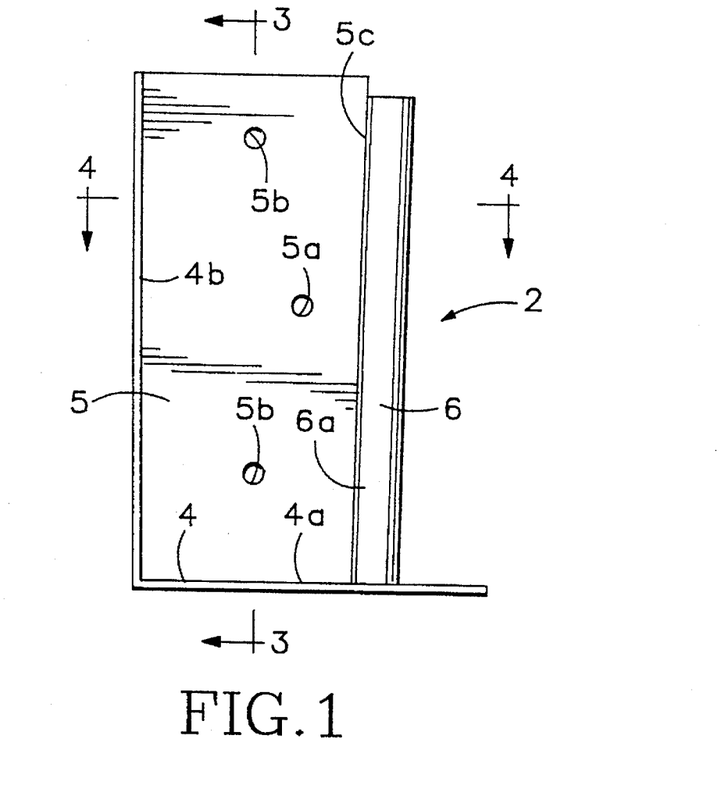
FIG. 1 is a side view of a first embodiment of a beam-fastening member in accordance with the present invention.
Figure 2:
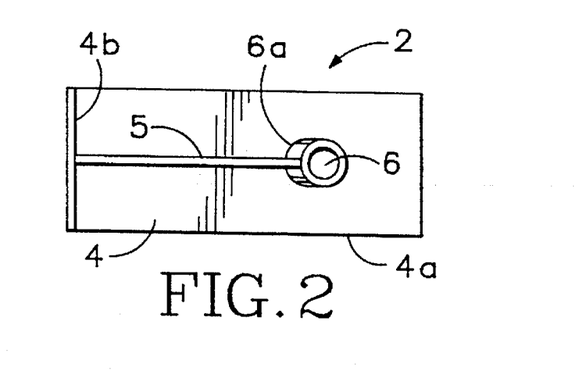
FIG. 2 is a top view of the fastening member of FIG. 1.
Figure 3:
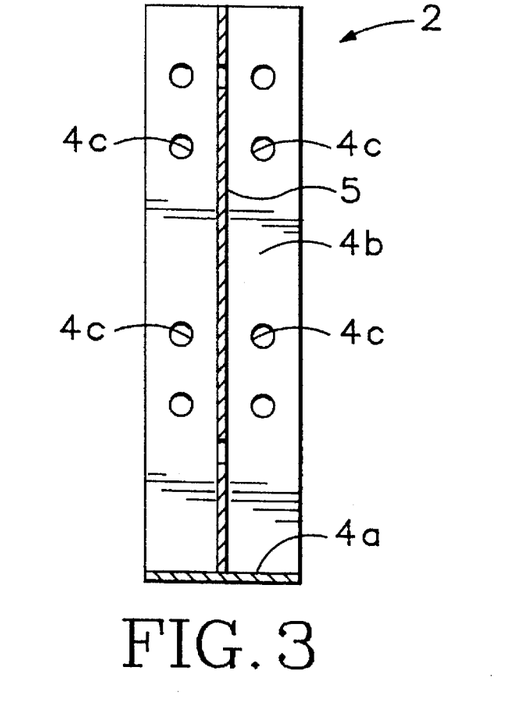
FIG. 3 is a sectional view taken along line 3—3 of FIG. 1.
Figure 4:
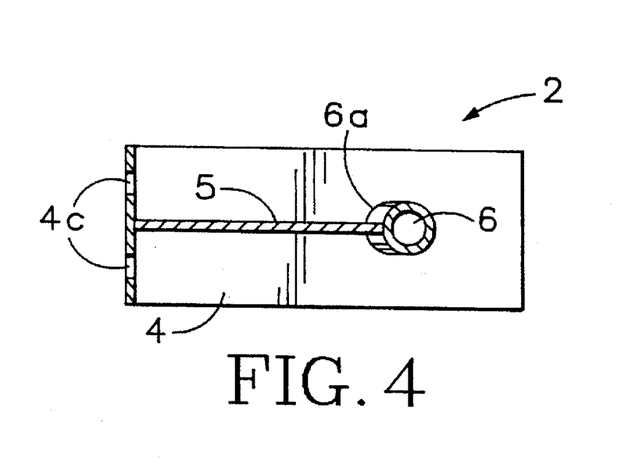
FIG. 4 is a sectional view taken along line 4—4 of FIG. 1.

Although cylindrical cam and cam follower surfaces 6a and 10, respectively, are preferred because of the ease of forming the aperture 3c in the beam 3 by drilling, other configurations could be substituted and are within the scope of the invention. For example, the wood compression member 6 could be a rectangular bar or plate forming a flat cam surface, rather than a cylindrical one, and the aperture 3c could be of corresponding rectangular shape forming a flat cam follower surface.

FIGS. 8–13 depict an alternative embodiment of a beam support system which operates in the same manner as does the embodiment of FIGS. 1–7 to precompress the end portion of the beam against the upright surface 80a of the beam-anchoring member 80. The fastening member 20 has a pair of inclined wood compression members 60 having inclined cylindrical cam surfaces 60a on a pair of webs 50 interconnected by an apertured upright mounting plate 40b and having a stop plate 40a welded to the bottoms thereof. Apertures 40c in the upright mounting plate 40b perform the same function as apertures 4c in the previous embodiment of FIGS. 1–7, while apertures 50a and 50b in the webs 50 perform the same functions as apertures 5a and 5b, respectively, in the previous embodiment. Correspondingly, the end portion 30b of the beam 30 is formed with an interface structure comprising an end surface 30a, a pair of vertical apertures 30c forming a pair of cam follower surfaces 100, a pair of slots 30d and channels 30e and 30f having the same dimensional relationships for performing the same functions as elements 3a, 3b, 3c, 3d and 3f, respectively, in the previous embodiment. Transverse apertures 110 and 120 and pin 130 perform the same functions as apertures 11 and 12 and pin 13, respectively, of the previous embodiment. An advantage of the embodiment of FIGS. 8–13 is that it is stronger and more economical to fabricate.

Alternatives to the embodiment of FIGS. 8–13 could provide flat cam surfaces formed on rectangular or plate-like wood compression members, rather than cylindrical cam surfaces. Moreover, if it were not desired to conceal the webs 50 for appearance sake, the webs 50 could conceivably be positioned exterior of the sides of the beam 30 with cam surfaces 60a extending inwardly therefrom rather than outwardly. All of these alternatives are intended to be within the scope of the present invention.

Figure 14:
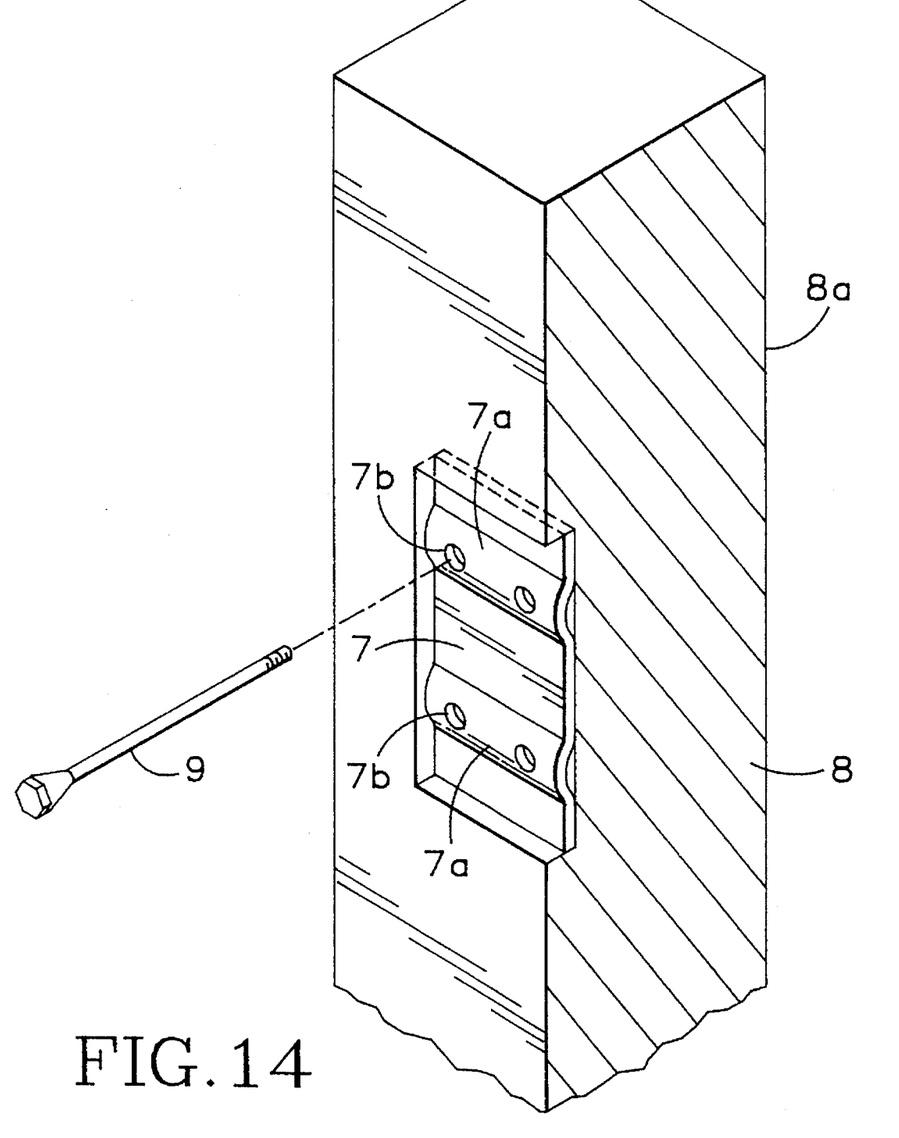
FIG. 14 is a perspective view of an exemplary undulated spring plate for mounting the fastening member of FIG. 1 or FIG. 8.

FIG. 14 shows a spring plate 7, usable in conjunction with the fastening members 2 or 20, for fastening the upright plates 4b or 40b to the upright surface of a beam-anchoring member such as a post or another beam. The spring plate 7 is a resiliently-deformable metal plate having undulations 7a preformed therein with apertures 7b formed through the undulations for accepting the nut and bolt assemblies 9. With the plate 7 bolted tightly to the side of a beam-anchoring member such as 8 opposite to its upright surface 8a to which the fastening member 2 or 20 is attached, the undulations 7a are resiliently deformed inwardly and thereafter perform as springs to absorb the gradual shrinkage of the beam-anchoring member. Without such a spring plate 7, the shrinkage would eventually relieve the tension of the nut and bolt assemblies 9, permitting the fastening member 2 or 20 to separate slightly from the upright face of the beam-anchoring member and thereby relieving the compression on the end portion of the beam originally created by the cam surfaces 6a or 60a during initial installation.

Figure 15:
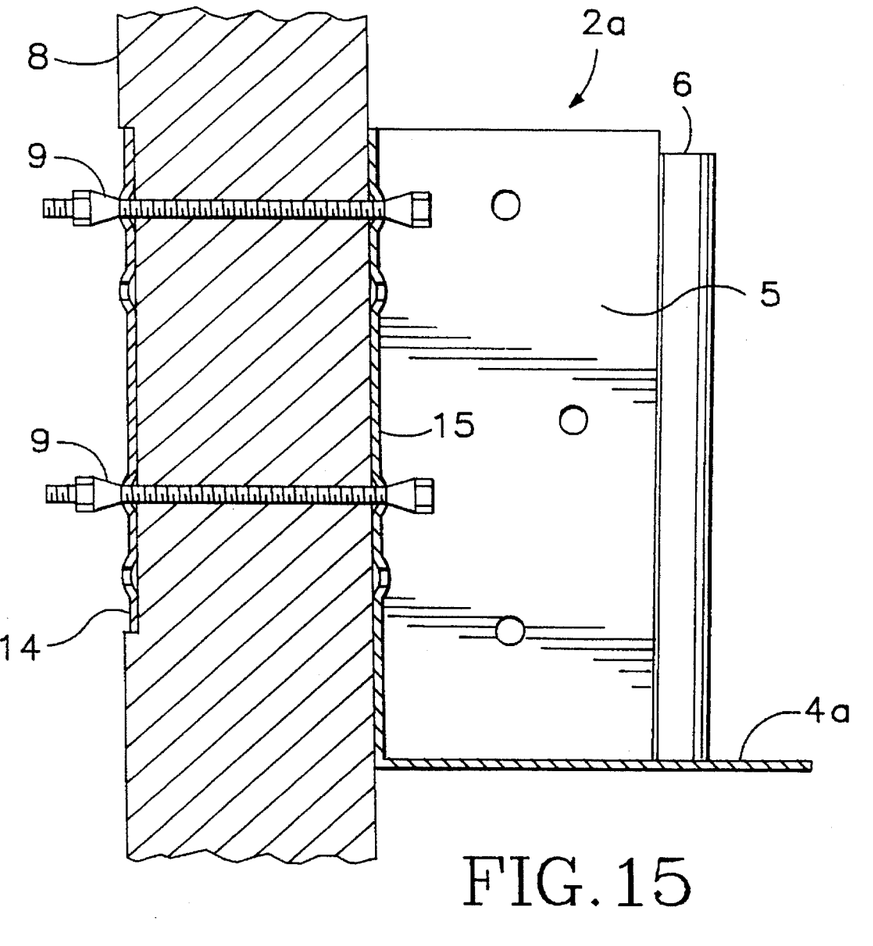
FIG. 15 is a sectional side view of an alternative embodiment of a fastening member similar to that of FIG. 1 and employing an integral spring mounting plate.

In conjunction with, or as an alternative to, the spring plate 7, the upright mounting plate 4b or 40b of the fastening member 2 or 20, respectively, may be replaced by a similar undulated spring plate 15 shown in FIG. 15 on a modified fastening member 2a. The combination of the spring plate 15 with a similar spring plate 14 on the opposite side of the beam-anchoring member absorbs shrinkage from both sides of the beam-anchoring member. Alternatively, the undulated spring plate 15 could be used alone, eliminating the spring plate on the opposite side of the beam-anchoring member. Of course, if the beam-anchoring member is of metal or other non-shrinkable material, no spring plates would be needed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A beam support system in combination with an elongate beam and an elongate beam anchoring member, said beam anchoring member having elongate parallel sides and a generally upright surface substantially parallel to said sides, said system comprising:

(a) a fastening member including at least one elongate cam surface and means for holding said elongate cam surface longitudinally at a substantially upright inclination relative to said upright surface, said elongate cam surface facing said upright surface and being spaced therefrom so that an upper portion of said elongate cam surface is spaced from said upright surface by a first distance and a lower portion of said elongate cam surface is spaced from said upright surface by a second distance less than said first distance, said elongate cam surface converging gradually toward said upright surface in a direction of convergence extending longitudinally along said elongate cam surface from said upper portion toward said lower portion of said elongate cam surface;

(b) said beam having an end portion including an end surface for engaging said upright surface and a cam follower surface interior of said end surface and facing away from said end surface for slidably engaging said elongate cam surface, said cam follower surface being spaced from said end surface by a distance less than said first distance but greater than said second distance, said cam follower surface comprising cam follower means for slidably moving along said elongate cam surface in said direction of convergence and thereby forcing said end surface compressively against said upright surface in a direction substantially perpendicular thereto automatically in response to movement of said cam follower means along said elongate cam surface in said direction of convergence.

2. The apparatus of claim 1, wherein said upright surface on said beam anchoring member is a part of said fastening member and is detachable connected to said beam anchoring member together with said fastening member.

3. The apparatus of claim 2 wherein said means for holding said elongate cam surface at said inclination relative to said upright surface includes a member rigidly interconnecting said upright surface with said elongate cam surface.

4. The apparatus of claim 3, wherein said member rigidly interconnecting said upright surface with said elongate cam surface includes stop means for limiting the slidability of said cam follower means along said elongate cam surface.

5. The apparatus of claim 1 wherein said elongate cam surface is one of a pair of elongate cam surfaces on said fastening member, and said cam follower surface is one of a pair of cam follower surfaces on said end portion of said beam.

6. The apparatus of claim 1 wherein said fastening member includes at least one aperture extending in a direction generally transverse to said elongate cam surface for attaching said end portion of said beam to said fastening member.

7. The apparatus of claim 1 wherein said elongate cam surface is metallic and said beam is wooden.

8. The apparatus of claim 1 wherein said cam follower surface is defined by a circular aperture extending transversely through said end portion of said beam.

9. The apparatus of claim 1 wherein said elongate cam surface is co-extensive along said direction of convergence with at least a major portion of said surface of said end portion of said beam.

\* \* \* \* \*

UNITED STATES PATENT AND TRADEMARK OFFICE
CERTIFICATE OF CORRECTION

PATENT NO. : 5,577,856

DATED : November 26, 1996

INVENTOR(S) : Junichi Tezuka

It is certified that error appears in the above-indentified patent and that said Letters Patent is hereby corrected as shown below:

Col. 6, line 52   After "portion of said" insert --end--.

Signed and Sealed this

Eleventh Day of March, 1997

Attest:

BRUCE LEHMAN

Attesting Officer   Commissioner of Patents and Trademarks